US012179560B2

(12) United States Patent
Son et al.

(10) Patent No.: US 12,179,560 B2
(45) Date of Patent: Dec. 31, 2024

(54) COMPRESSOR CONTROL APPARATUS AND METHOD

(71) Applicants: HYUNDAI MOTOR COMPANY, Seoul (KR); KIA CORPORATION, Seoul (KR)

(72) Inventors: Ji Wan Son, Yongin-si (KR); Chang Hwan Kim, Seoul (KR); Sang Hun Lee, Incheon (KR); Tae Woong Lim, Hwaseong-si (KR); Jin Sung Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 262 days.

(21) Appl. No.: 17/522,775

(22) Filed: Nov. 9, 2021

(65) Prior Publication Data

US 2022/0297509 A1 Sep. 22, 2022

(30) Foreign Application Priority Data

Mar. 22, 2021 (KR) .................. 10-2021-0036395

(51) Int. Cl.
*B60H 1/32* (2006.01)
(52) U.S. Cl.
CPC ......... *B60H 1/3205* (2013.01); *B60H 1/3222* (2013.01)
(58) Field of Classification Search
CPC ........ B60H 2001/325; B60H 2001/327; B60H 2001/3292; B60H 2001/3272;
(Continued)

(56) References Cited

U.S. PATENT DOCUMENTS 6,105,380 A * 8/2000 Yokomachi .......... F25B 49/022
 62/217
11,300,060 B1 * 4/2022 Dudar ..................... F02D 23/00
(Continued)

FOREIGN PATENT DOCUMENTS

JP 2002106473 A 4/2002

OTHER PUBLICATIONS

NPL1 Admitted prior art (Year: 2020).*

*Primary Examiner* — Jianying C Atkisson
*Assistant Examiner* — Meraj A Shaikh
(74) *Attorney, Agent, or Firm* — Lempia Summerfield Katz LLC

(57) ABSTRACT

A compressor control apparatus and method includes: a sensor configured to detect air conditioner operation state information necessary to control engagement and disengagement of a clutch of an air conditioner compressor; an electromagnetic coil in the clutch of the air conditioner compressor configured to perform clutch engagement upon receiving battery current; a microcomputer configured to determine whether the current air conditioner operation state satisfies a clutch engagement allowance condition or a clutch disengagement condition based on the air conditioner operation state information detected by the sensor and to output an operation signal based on the result of determination; and a switch configured to be turned on or off according to the operation signal output by the microcomputer and to control supply of the battery current to the electromagnetic coil such that clutch engagement or clutch disengagement is performed.

24 Claims, 4 Drawing Sheets

(58) Field of Classification Search
CPC .... B60H 2001/3261; B60H 2001/3285; B60H 1/3205; B60H 1/3222; B60H 1/3208; B60H 1/00978; B60H 1/00735
See application file for complete search history.

(56) References Cited

U.S. PATENT DOCUMENTS

| | | | |
|---|---|---|---|
| 2008/0006047 A1* | 1/2008 | Harrison | B60H 1/3208 |
| | | | 165/44 |
| 2017/0015175 A1* | 1/2017 | Pursifull | B60H 1/00735 |
| 2019/0296304 A1* | 9/2019 | Sodeyama | B60L 58/18 |
| 2021/0062709 A1* | 3/2021 | Takayama | F02D 37/02 |
| 2021/0080163 A1* | 3/2021 | Fujita | F04B 49/20 |
| 2021/0199335 A9* | 7/2021 | Mowris | F24F 11/0001 |

* cited by examiner

FIG. 1 – Prior Art
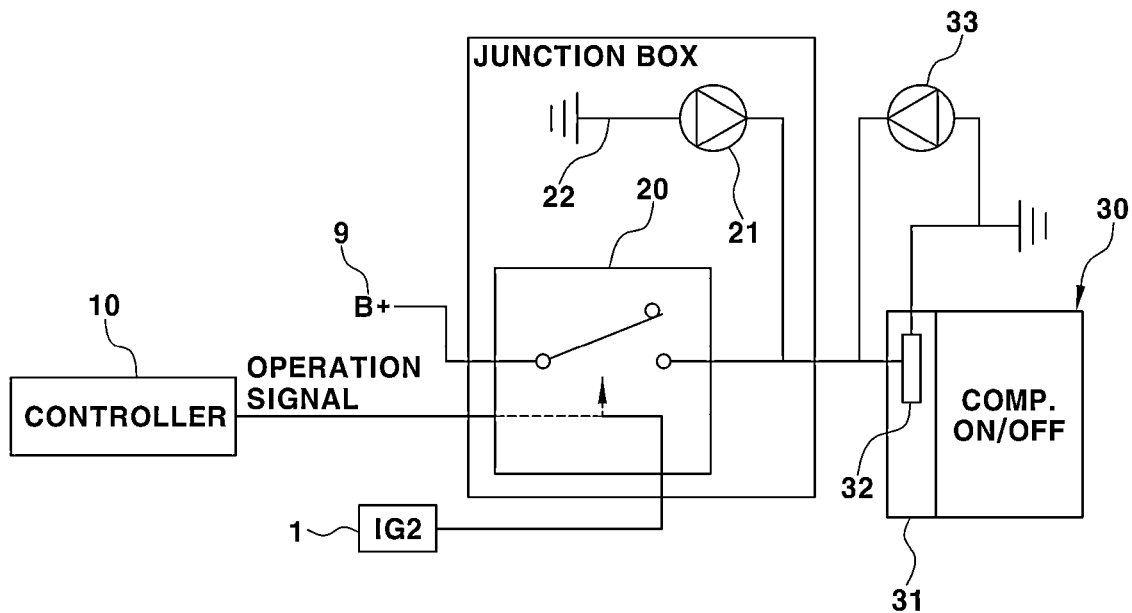
FIG. 2
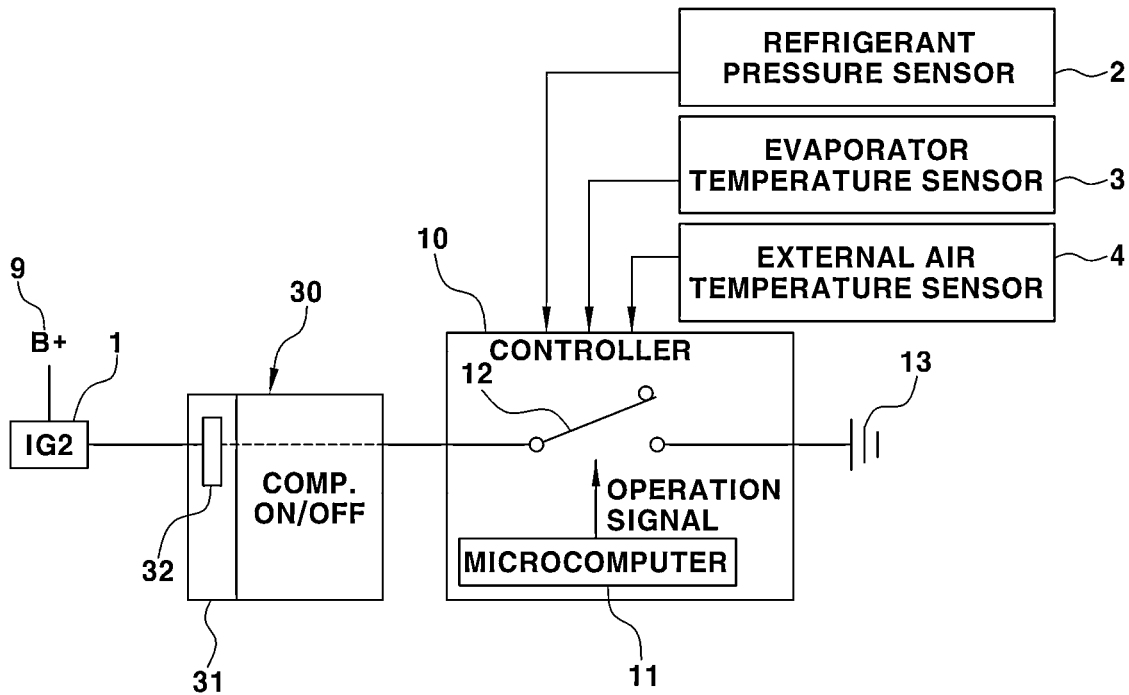

COMPRESSOR CONTROL APPARATUS AND METHOD

CROSS-REFERENCE TO RELATED APPLICATION

This application claims, under 35 U.S.C. § 119(a), the benefit of priority to Korean Patent Application No. 10-2021-0036395 on Mar. 22, 2021, the entire contents of which are incorporated herein by reference.

BACKGROUND

(a) Technical Field

The present disclosure relates to a compressor control apparatus and a method, and more particularly to a compressor control apparatus and a method capable of simplifying the construction of a compressor control circuit, reducing the number of parts, and reducing costs.

(b) Background Art

In general, a vehicle is equipped with an air conditioning apparatus configured to heat or cool the interior of the vehicle. The air conditioning apparatus constantly maintains the temperature in the interior of the vehicle at the optimum temperature, irrespective of a change in temperature of external air and thus provides a comfortable interior environment.

An air conditioning apparatus for vehicles includes an air conditioner system configured to circulate a refrigerant. The air conditioner system mainly includes a compressor configured to compress a refrigerant, a condenser configured to condense the refrigerant compressed by the compressor so as to be liquefied, an expansion valve configured to expand the refrigerant liquefied as the result of being condensed by the condenser, and an evaporator configured to evaporate the refrigerant expanded by the expansion valve and to cool air blown to the interior of the vehicle using latent heat of evaporation of the refrigerant.

In the air conditioner system, the high-temperature and high-pressure gaseous refrigerant compressed by the compressor is condensed by the condenser into a liquid state and is circulated to the compressor via the expansion valve and the evaporator in a cooling mode in summer. In this process, the low-temperature and low-pressure liquid refrigerant expanded by the expansion valve is supplied to the evaporator and is air cooled through heat exchange with the refrigerant evaporated by the evaporator. The expanded and cooled air is discharged to the interior of the vehicle, and thus interior cooling is achieved.

Meanwhile, in the vehicle, control of the air conditioner compressor and supply of power to the air conditioner compressor are performed by a controller and a relay switch in a junction box. In addition, the component of the air conditioner system of the vehicle configured to selectively operate the compressor using power from a battery is a clutch of the compressor.

FIG. 1 is a view showing the construction of a conventional compressor control apparatus. FIG. 1 shows a control circuit configured to control the operation of a compressor 30, wherein the control circuit includes a controller 10, a relay switch 20, and a clutch 31 of the compressor 30.

The clutch 31 of the compressor 30 is provided with an electromagnetic coil 32. The clutch 31 connects the compressor 30 and an engine (not shown) such that power transmission is possible using magnetomotive force induced by current. In other words, when the air conditioner is turned on, the clutch 31 of the compressor 30 is engaged by the controller 10, whereby rotational force of an engine crankshaft (not shown) transmitted to a pulley (not shown) of the compressor 30 is transmitted to a compressor shaft (not shown). Therefore, the compressor 30, which is configured to compress a refrigerant, is operated by engine rotation force.

The relay switch 20 is configured to selectively supply current of a battery 9 to the clutch 31 of the compressor 30. The relay switch 20 is turned on according to an operation signal (relay driving signal) output by the controller 10 and controls the supply of power to the electromagnetic coil 32 of the clutch 31 such that the operation of the compressor 30 is controlled.

At this time, the controller 10 determines whether to operate the compressor in consideration of compressor operation conditions and external conditions and transmits an operation signal to the relay switch 20. In other words, the coil side of the relay switch 20 is excited according to the operation signal, whereby the contact side of the relay switch 20 is closed and thus current of the battery 9 is applied to the electromagnetic coil 32 of the clutch 31 via the contact side.

When the current is applied to the electromagnetic coil 32, as described above, the clutch is engaged by magnetic force of the electromagnetic coil 32. Therefore, the engine rotation force transmitted to the pulley is transmitted to the compressor shaft and thus the compressor 30 is operated. In addition, when the operation signal (excitation current) is not applied to the coil side of the relay switch 20 and the contact side is opened. Thus, current of the battery 9 does not flow to the electromagnetic coil 32 of the clutch 31 and magnetic force of the electromagnetic coil is lost. Therefore, the clutch is disengaged and thus connection between the engine and the compressor is released.

In addition, diodes 21 and 33 configured to solve a surge voltage (back electromagnetic force) problem at the time of clutch disengagement are installed at the relay switch 20 and the clutch 31, respectively. The controller 10 outputs only a signal for compressor operation (clutch engagement) and non-operation (clutch disengagement) and the relay switch 20 controls a power supply path (through opening and closing of the contact side of the relay switch) to control the compressor 30.

At this time, a diode 21 and a ground wire 22 configured to reduce sparks occurring at the relay switch 20 and opening and closing-based surge voltage occurring at the front and rear ends of the contact side of the relay switch are necessary. In addition, it is necessary to provide a diode 33 and a circuit configured to remove back electromagnetic force due to current fluctuation when the relay switch is opened and closed at the clutch 31 of the compressor 30, which complicates the construction of the circuit.

The above information disclosed in this Background section is provided only for enhancement of understanding of the background of the present disclosure and therefore it may contain information that does not form the prior art that is already known in this country to a person of ordinary skill in the art.

SUMMARY OF THE DISCLOSURE

The present disclosure has been made in an effort to solve the above-described problems associated with the prior art.

It is an object of the present disclosure to provide a compressor control apparatus and a method capable of simplifying the construction of a compressor control circuit, reducing the number of parts, and reducing costs.

The objects of the present disclosure are not limited to those described above. Other unmentioned objects of the present disclosure should be clearly understood by a person of ordinary skill in the art (hereinafter referred to as an "ordinary skilled person") from the following description.

In order to accomplish the object, in an aspect, the present disclosure provides a compressor control apparatus including a sensor configured to detect air conditioner operation state information necessary to control engagement and disengagement of a clutch of an air conditioner compressor. The compressor control apparatus also includes an electromagnetic coil in the clutch of the air conditioner compressor configured to perform clutch engagement upon receiving battery current. The compressor control apparatus also includes a microcomputer configured to determine whether the current air conditioner operation state satisfies a clutch engagement allowance condition or a clutch disengagement condition based on the air conditioner operation state information detected by the sensor and to output an operation signal based on the result of determination. The compressor control apparatus also includes a switch configured to be turned on or off according to the operation signal output by the microcomputer and to control supply of the battery current to the electromagnetic coil such that clutch engagement or clutch disengagement is performed.

In another aspect, the present disclosure provides a compressor control method including detecting, by a sensor, air conditioner operation state information necessary to control engagement and disengagement of a clutch of an air conditioner compressor. The compressor control method also includes determining, by a microcomputer, whether the current air conditioner operation state satisfies a clutch engagement allowance condition or a clutch disengagement condition based on the air conditioner operation state information detected by the sensor and outputting an operation signal based on the result of determination. The compressor control method also includes turning on or off a switch configured to control supply of battery current to an electromagnetic coil in the clutch according to the operation signal output by the microcomputer such that clutch engagement or clutch disengagement is performed.

Other aspects and embodiments of the present disclosure are discussed below.

BRIEF DESCRIPTION OF THE DRAWINGS

The above and other features of the present disclosure are now described in detail with reference to certain embodiments thereof illustrated in the accompanying drawings, which are given hereinbelow by way of illustration only, and thus do not limit the present disclosure, and wherein:

FIG. 1 is a view showing the construction of a conventional compressor control apparatus;

FIG. 2 is a view showing the construction of a control apparatus according to an embodiment of the present disclosure;

Figure 3A:
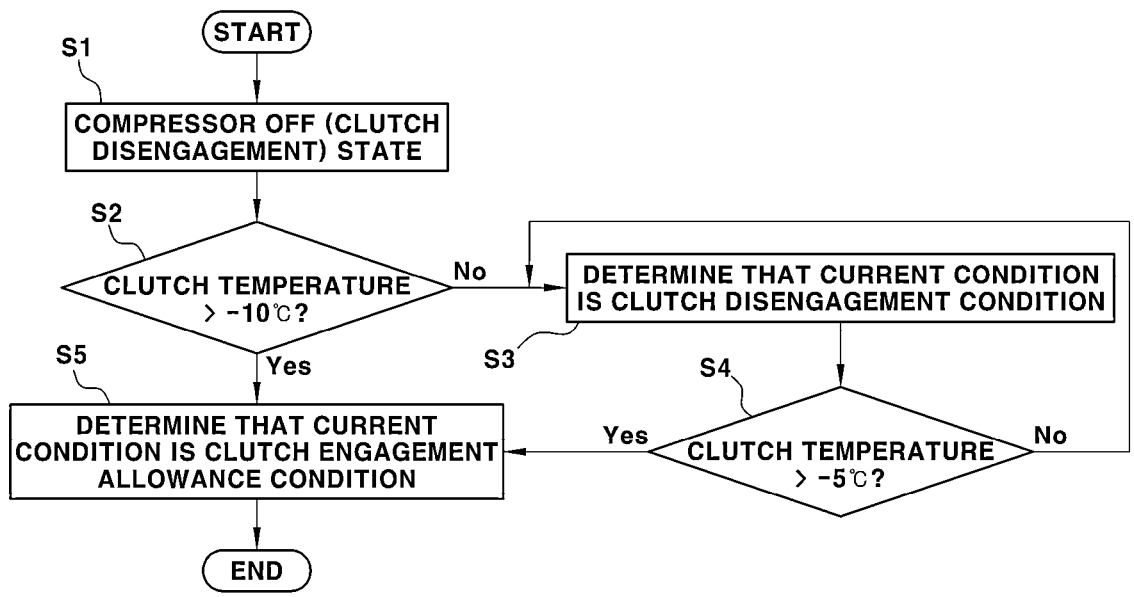
FIGS. 3A and 3B are flowcharts showing a compressor clutch operation condition determination logic in a control method according to an embodiment of the present disclosure.

It should be understood that the appended drawings are not necessarily to scale and present a somewhat simplified representation of various features illustrating the basic principles of the present disclosure. The specific design features of the present inventive concept as disclosed herein, including, for example, specific dimensions, orientations, locations, and shapes, are determined in part by the particular intended application and use environment.

In the figures, reference numbers refer to the same or equivalent parts of the present disclosure throughout the several figures of the drawing.

DETAILED DESCRIPTION

Specific structural or functional descriptions of the embodiments of the present inventive concept disclosed in this specification are given only to illustrate embodiments of the present disclosure. Embodiments of the present disclosure may be realized in various forms. In addition, the embodiments according to the concept of the present disclosure are not limited to such specific embodiments. It should be understood that the present disclosure includes all alterations, equivalents, and substitutes that fall within the idea and technical scope of the present disclosure.

It should be understood that, although the terms "first", "second", etc. may be used herein to describe various elements, corresponding elements should not be understood as being limited by these terms, which are used only to distinguish one element from another. For example, within the scope defined by the present disclosure, a first element may be referred to as a second element, and similarly, a second element may be referred to as a first element.

It should be understood that, when a component is referred to as being "connected to" or "coupled to" another component, it may be directly connected to or coupled to the other component, or intervening components may be present. In contrast, when a component is referred to as being "directly connected to" or "directly coupled to" another component, there are no intervening components present. Other terms that describe the relationship between components, such as "between" and "directly between" or "adjacent to" and "directly adjacent to", are to be interpreted in the same manner.

Wherever possible, the same reference numbers are used throughout the drawings to refer to the same or like parts. The terms used in this specification are provided only to explain specific embodiments but are not intended to restrict the present disclosure. A singular representation may include a plural representation unless it represents a definitely different meaning from the context. It should be further understood that the terms "comprises", "comprising" and the like, when used in this specification, specify the presence of stated components, steps, operations, and/or elements but do not preclude the presence or addition of one or more other components, steps, operations, and/or elements. When a component, device, element, or the like of the present disclosure is described as having a purpose or performing an operation, function, or the like, the component, device, or element should be considered herein as being "configured to" meet that purpose or to perform that operation or function.

The present disclosure relates to a compressor control apparatus and a method capable of simplifying the construction of a compressor control circuit, reducing the number of parts, and reducing costs. In the present disclosure, a circuit is simplified and optimized, compared to the conventional art by using a switch in a controller at the rear side of a load end (an electromagnetic coil of a compressor clutch) as a circuit opening and closing means for compressor control, instead of removing a relay switch in a junction box for compressor operation and a circuit related thereto.

Also, in the present disclosure, circuit opening and closing for clutch power supply control is directly performed in a controller, i.e., an engine control unit (ECU) and the controller determines whether clutch engagement is possible and directly controls clutch operation.

To this end, the resistance value and the power value of the compressor clutch (electromagnetic coil of the clutch) allowable by the controller must be selected and logic for determining and solving a problem in that the current value becomes an allowable value (current limit) or more and reoperating the compressor is necessary. In addition, it is necessary to add logic for estimating the temperature at which the resistance value of the clutch reaches a lower limit and determining whether clutch engagement is possible in order to secure circuit stability and to extend an actually possible engagement range.

Hereinafter, an embodiment of the present disclosure is described in detail with reference to the accompanying drawings. FIG. 2 is a view showing the construction of a control apparatus according to an embodiment of the present disclosure. In the present disclosure, the relay switch 20 for the compressor clutch in the junction box and the diode 21 for surge voltage prevention are removed from the conventional control circuit (see FIG. 1) and the diode 33 is also removed from the clutch 31 of the compressor 30.

Instead, as shown in FIG. 2, in the present disclosure includes a switch 12 provided in a controller (ECU) 10 so as to control the supply of power to a clutch 31 of a compressor 30 and to open and close a circuit. In other words, the supply of power to the clutch 31 of the compressor 30 is controlled using the switch 12 in the controller 10. Here, a portion of the clutch 31 of the compressor 30 to which power is supplied, i.e. a load portion, is an electromagnetic coil 32.

In the embodiment of the present disclosure, the switch 12 may be a switching element configured to be opened and closed according to an operation signal output by a microcomputer 11 of the controller 10 or may be a semiconductor switch, such as a metal oxide semiconductor field effect transistor (MOSFET).

A vehicle is equipped with an ignition (IG2) power end 1, which is turned on (IG2 on) at the time of key on. In the present disclosure, the electromagnetic coil 32 of the clutch 31 is directly connected to the ignition power end 1 of the vehicle. Consequently, the electromagnetic coil 32 is connected to battery power B+ via the ignition power end 1 of the vehicle. In the case in which the electromagnetic coil 32 is connected to the battery power B+ via the ignition power end 1 of the vehicle, as described above, it is possible to prevent battery discharge due to short circuit in a key off state.

In the case in which a battery 9 and the electromagnetic coil 32 of the clutch 31, which is a load, are directly connected to each other via a circuit, as in the embodiment of FIG. 2, the battery may be discharged. In the present disclosure, therefore, the ignition power end 1 is disposed between the battery power B+ and the electromagnetic coil 32 of the clutch 31 such that current of the battery 9 is supplied only in the key on state.

In other words, the electromagnetic coil 32 of the clutch 31 is connected to the ignition power end 1 such that the electromagnetic coil of the clutch is connected to the battery power B+ via the ignition power end. A circuit of the ignition power end is closed only in the key on (i.e. IG2 on) state, whereby the battery power B+, which is vehicle power, is supplied to the load in the vehicle. In other words, current of the battery 9 flows to the electromagnetic coil 32 of the clutch 31 via the ignition power end 1 only in the key on state.

Of course, when current of the battery 9 flows to the electromagnetic coil 32, clutch engagement is performed, whereby engine rotation force transmitted to a pulley is transmitted to a compressor shaft. Therefore, the compressor 30 compresses a refrigerant. Since an air conditioner is operated only in the key on (i.e. IG2 on) state, there is no problem in connecting the electromagnetic coil 32 of the clutch 31, which is a load, to the ignition power end 1.

In addition, the electromagnetic coil 32 of the clutch 31 is connected one terminal of the switch 12 in the controller 10 and the other terminal of the switch 12 in the controller 10 is connected to a ground end 13. In other words, a circuit is formed so as to form an electrical conduction path of the battery 9→the ignition power end 1→the clutch 31 of the compressor 30 (electromagnetic coil)→the switch 12 in the controller (ECU) 10→the ground end 13.

Since the battery power B+ is connected to the electromagnetic coil 32 of the clutch 31 via the ignition power end 1 and the electromagnetic coil 32 of the clutch 31 is connected to the ground end 13 via the switch 12 in the controller 10, as described above, the switch 12 in the controller 10 is turned off by the microcomputer 11 when the air conditioner is turned off. Thus, no current flows to the electromagnetic coil 32 of the clutch 31.

In the present disclosure, when current of the battery 9 flows to the electromagnetic coil 32 of the clutch 31, clutch engagement is performed. When current of the battery 9 does not flow to the electromagnetic coil 32 of the clutch 31 while the vehicle is driven, the clutch 31 is disengaged. In the following description, clutch engagement means a clutch coupling state in which power transmission is possible and clutch disengagement means a clutch decoupling state in which no power is transmitted between opposite ends of the clutch.

When the air conditioner is turned on, on the other hand, an operation signal output by the microcomputer 11 of the controller (ECU) 10 is transmitted to the switch 12 in the controller and thus the switch in the controller is closed. At this time, current of the battery 9 sequentially passes through the IG power end 1, the electromagnetic coil 32 of the clutch 31, and the switch 12 in the controller 10, and then flows to the ground end 13 connected to the controller.

As the current is applied to the electromagnetic coil 32 of the clutch 31, as described above, clutch engagement is performed, and engine rotation force transmitted to the pulley (not shown) is transmitted to the compressor shaft (not shown) in the clutch engagement state, whereby the refrigerant is compressed by the compressor 30.

In the air conditioner off state, the switch 12 in the controller 10 is maintained off (open) by the microcomputer 11 of the controller (ECU) 10.

In the air conditioner on state, the switch 12 in the controller 10 is turned on according to an operation signal output by the microcomputer 11 of the controller. In other words, when the switch 12 in the controller 10 is turned on, the clutch engagement is performed, the compressor 30 is turned on, and the air conditioner is turned on. When the switch 12 in the controller 10 is turned off, the clutch disengagement is performed, the compressor 30 is turned off, and the air conditioner is turned off.

When the switch 12 in the controller 10 is turned off again while current flows in the state in which the switch is on, an instantaneous voltage difference occurs between the front and rear ends of the switch, whereby surge voltage or sparks may occur. In order to remove this, a reduction element installed in the controller 10 so as to be connected to the switch via a circuit, such as a common diode, may be used.

Since surge voltage or sparks are removed using the switch side reduction element in the controller, as described above, it is possible to remove a reduction element installed at the conventional junction box and load side. In the case in which the capacity of the reduction element in the controller is insufficient, however, a diode configured to inhibit occurrence of surge voltage or sparks may be added to the load end (clutch side).

Meanwhile, as can be seen from FIG. 2, in the state in which the switch 12 in the controller 10 is on, current that flows along the electromagnetic coil 32 of the clutch 31 flows to the ground end 13 via the switch 12 in the controller 10. At this time, a current limit value is set in the microcomputer 11 such that current having a predetermined value or more does not flow to the interior of the controller 10 and the switch 12.

In other words, the microcomputer 11 of the controller 10 monitors operation current that flows to the interior of the controller 10 and the switch 12 after passing through the electromagnetic coil 32 of the clutch 31 through a sensor. When the operation current is equal to or greater than the current limit value, i.e. overcurrent, the microcomputer 11 keeps the switch 12 in the controller 10 off. The state in which the switch in the controller is off means the clutch disengagement state and the air conditioner off state.

Figure 3B:
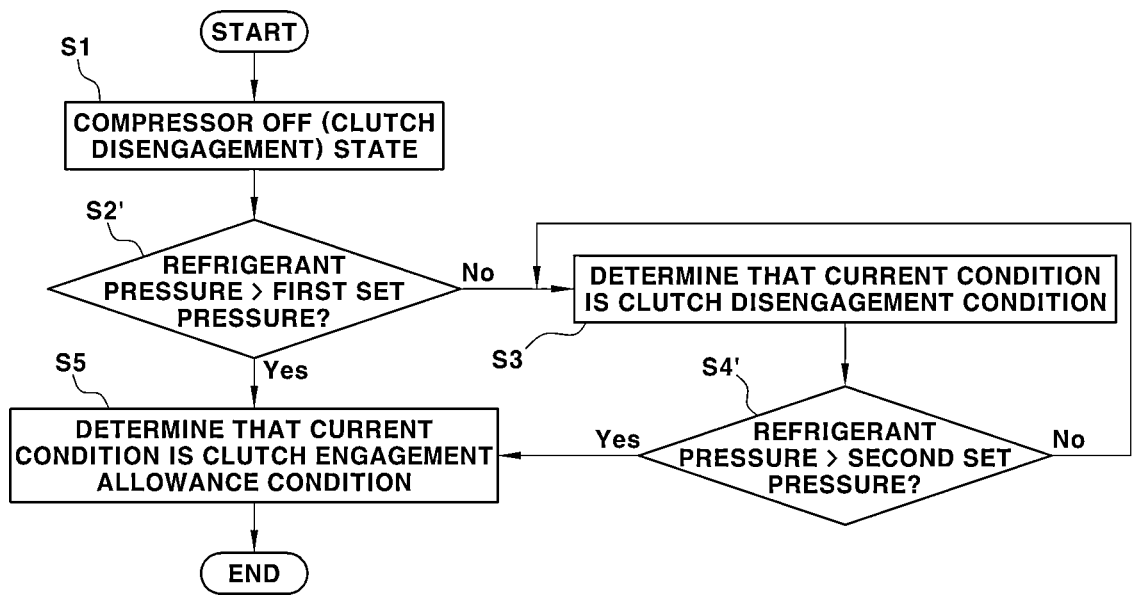
Figure 4:
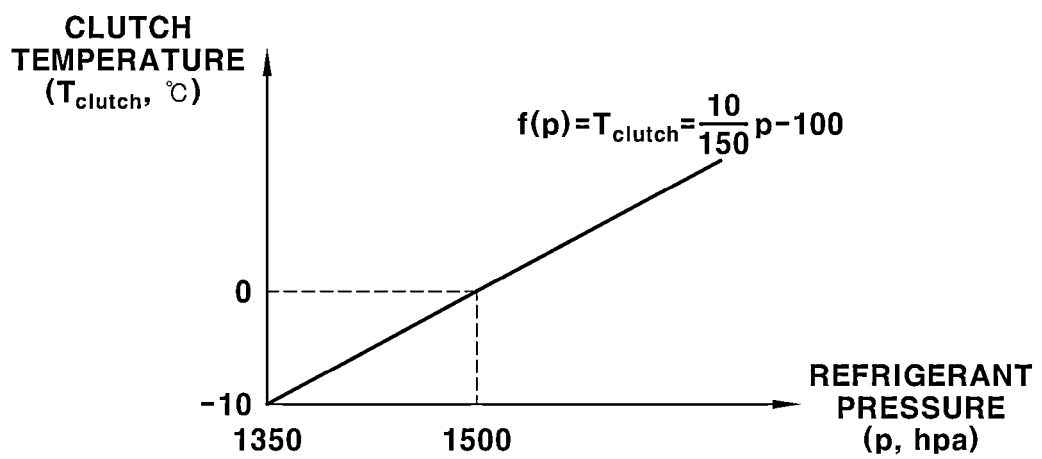
FIG. 4 is a view showing an example of set data in which the temperature of a clutch is set depending on the pressure of a refrigerant in the control method according to the embodiment of the present disclosure.

Hereinafter, a compressor control method according to an embodiment of the present disclosure is described in detail. FIGS. 3A and 3B are flowcharts showing compressor clutch operation condition determination logic in a control method according to an embodiment of the present disclosure. FIG. 4 is a view showing an example of set data in which the temperature of the clutch is set depending on the pressure of the refrigerant in the control method according to the embodiment of the present disclosure. The clutch operation condition determination logic of FIGS. 3A and 3B is performed by the microcomputer 11 of the controller 10.

The value of current that flows in the electromagnetic coil 32 of the clutch 31 is changed depending on the value of resistance of the electromagnetic coil and the value of voltage of the battery 9. In addition, the value of resistance of the electromagnetic coil 32 is changed depending on the temperature of the electromagnetic coil. In other words, the value of resistance of the electromagnetic coil 32 is small when the temperature of the electromagnetic coil is low.

In addition, the value of current that flows in the electromagnetic coil 32 of the clutch 31 is large when the temperature of the electromagnetic coil, which acts as resistance, is low or the value of voltage of the battery is large. In other words, when the temperature of the electromagnetic coil is low or the value of voltage of the battery is large, a large amount of current flows in the electromagnetic coil. Hereinafter, the current that passes through the electromagnetic coil of the clutch is referred to as "operation current."

In general, the temperature of the electromagnetic coil is the temperature of the clutch and the clutch has no sensor configured to detect the temperature of the electromagnetic coil. In the present disclosure, therefore, the temperature of the electromagnetic coil, i.e. the temperature of the clutch, is converted from the pressure of the air conditioner refrigerant detected by a refrigerant pressure sensor 2 and a clutch engagement allowance condition may be determined based on the converted temperature of the clutch.

In other words, as shown in FIG. 3A, in the case in which, in a compressor clutch disengagement state (S1), the converted temperature of the clutch (temperature of the electromagnetic coil) is compared with a first set temperature (e.g. −10° C.) (S2) and is higher than the first set temperature, the value of resistance of the electromagnetic coil 32 increases. Thus, the operation current becomes less than the current limit. At this time, the microcomputer 11 of the controller 10 may determine the current condition to be a clutch engagement allowance condition (S5).

In the case in which the converted temperature of the clutch 31 is equal to or lower than the first set temperature in step S2, on the other hand, the value of resistance of the electromagnetic coil 32 decreases, whereby the operation current may become equal to or greater than the current limit. Consequently, the microcomputer 11 of the controller 10 may determine the current condition to be a clutch disengagement condition (S3).

In addition, as shown in FIG. 3A, in the case in which, in the state in which the current condition is determined to be a clutch disengagement condition, the converted temperature of the clutch 31 (temperature of the electromagnetic coil) is compared with a second set temperature (e.g. −5° C.) (S4) and is higher than the second set temperature, the microcomputer 11 of the controller 10 may determine the current condition to be a clutch engagement allowance condition (S5).

In the controller 10, the first set temperature and the second set temperature may be set so as to have a relationship of second set temperature>first set temperature. The reason for this is that it is necessary to set a hysteresis period in determining whether the current condition is a clutch engagement allowance condition or a clutch disengagement condition based on the converted temperature of the clutch.

In the embodiment of the present disclosure, the microcomputer 11 of the controller 10 may use data in which the temperature of the clutch is set based on the pressure of the refrigerant, as shown in FIG. 4, in order to calculate the temperature of the clutch 31 from the pressure of the air conditioner refrigerant detected by the refrigerant pressure sensor 2. The set data shown in FIG. 4 are obtained using data acquired through prior research and evaluation tests. The example of FIG. 4 shows a map that defines a relationship between the pressure of the refrigerant and the temperature of the clutch. However, a table or formula that defines a relationship between the pressure of the refrigerant and the temperature of the clutch may be used in addition to the map.

In the map of FIG. 4, the temperature of the clutch based on the pressure of the refrigerant may be represented by Equation 1 below. In the present disclosure, clutch temperature $T_{clutch}$ may be calculated from refrigerant pressure p using Equation 1 below, which is a linear equation.

$$f(p) = T_{clutch} = A \times p + B \quad \text{[Equation 1]}$$

In the case in which Equation 1 above is used, values of A and B are preset by the microcomputer of the controller.

In the present disclosure, as described above, the temperature of the clutch is converted from the pressure of the refrigerant using set data in which a relationship between the clutch temperature $T_{clutch}$ and refrigerant pressure p is defined. Whether the current condition is a clutch engagement allowance condition or a clutch disengagement condition is determined based on the converted temperature of the clutch.

In the above description, the microcomputer 11 of the controller 10 compares the temperature of the clutch with the first set temperature in order to determine whether the current condition is a clutch engagement allowance condition or a clutch disengagement condition. Here, the temperature of the clutch is converted from the pressure of the refrigerant detected by the refrigerant pressure sensor 2 and the temperature of the clutch and the pressure of the refrigerant increase and decrease in proportion to each other, as shown in FIG. 4. Consequently, the pressure of the refrigerant detected by the refrigerant pressure sensor 2 may also be compared with the set pressure for determination instead of comparison between the temperature of the clutch and the set temperature.

In other words, as shown in FIG. 3B, in the case in which, in a clutch disengagement state, the pressure of the refrigerant detected by the refrigerant pressure sensor 2 is compared with a predetermined first set pressure (S2') and the detected pressure of the refrigerant is higher than the first set pressure, the microcomputer 11 may be set to determine that a clutch engagement allowance condition is satisfied (S5). On the other hand, in the case in which, in a clutch disengagement state, the pressure of the refrigerant detected by the refrigerant pressure sensor 2 is equal to lower than the first set pressure, the microcomputer 11 may be set to determine that a clutch disengagement condition is satisfied (S3).

Also, in the state in which the current condition is determined to be a clutch disengagement condition, the pressure of the refrigerant detected by the refrigerant pressure sensor 2 is compared with a predetermined second set pressure (S4') and the detected pressure of the refrigerant is higher than the second set pressure. In the above case, the microcomputer 11 may be set to determine that a clutch engagement allowance condition is satisfied (S5).

In the microcomputer 11 of the controller 10, the first set pressure and the second set pressure may be set so as to have a relationship of second set pressure>first set pressure. Here, the first set pressure may be a pressure value having a relationship of Equation 1 and FIG. 4 with the first set temperature and the second set pressure may be a pressure value having a relationship of Equation 1 and FIG. 4 with the second set temperature.

Figure 5:
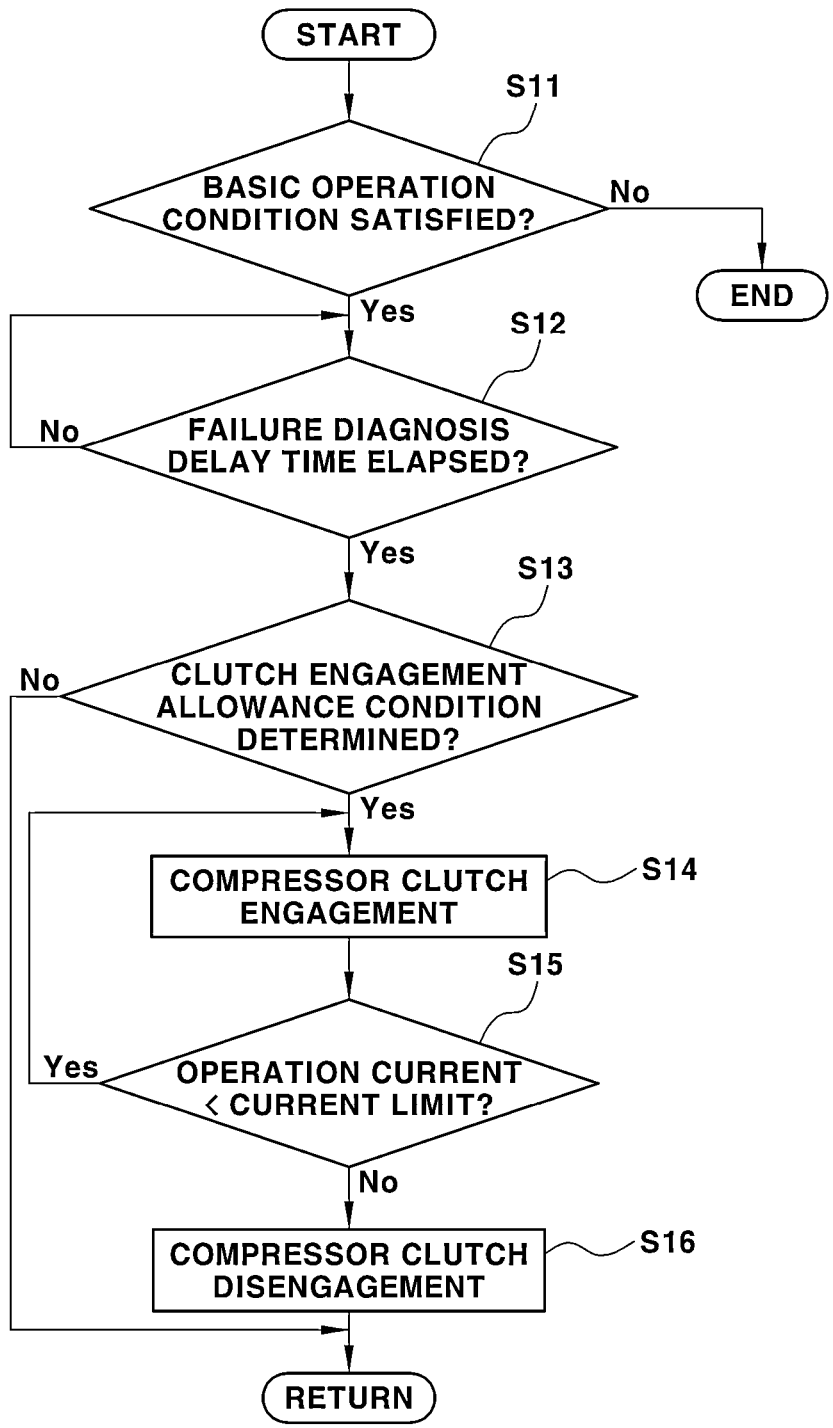
FIG. 5 is a flowchart showing an air conditioner compressor reoperation logic in the control method according to the embodiment of the present disclosure.

In addition, the compressor control method according to the embodiment of the present disclosure includes a control method for reoperating the compressor 30 in an overcurrent off state of the compressor. FIG. 5 is a flowchart showing an air conditioner compressor reoperation logic in the control method according to the embodiment of the present disclosure. The air conditioner compressor reoperation logic shown in FIG. 5 may be performed by the microcomputer 11 of the controller 10.

Basically, in an overcurrent condition in which the value of operation current that flows in the electromagnetic coil 32 of the clutch 31 is equal to or greater than the current limit value set by the controller, the microcomputer 11 of the controller 10 turns off the switch 12 in the controller to disengage the clutch and performs control such that the compressor and the air conditioner are turned off.

Also, in the case in which the converted temperature of the clutch 31 is equal to or lower than the first set temperature and the current condition is determined to be a clutch disengagement condition in the compressor clutch operation condition determination logic of FIG. 3A, the microcomputer 11 of the controller 10 turns off the switch 12 in the controller to disengage the clutch 31 and performs control such that the compressor and the air conditioner are turned off.

More specifically, in the embodiment of the present disclosure, upon determining that a predetermined reoperation condition is satisfied and at the same time the current condition is a clutch engagement allowance condition, the controller 10 reoperates the compressor. Here, the overcurrent off state of the compressor 30 may include a state in which the switch 12 is turned off by the controller 10 and thus the clutch 31 is disengaged and the compressor 30 is turned off in the overcurrent condition in which the value of operation current that flows in the electromagnetic coil 32 of the clutch 31 is equal to or greater than the current limit value set by the controller 10.

In addition, the overcurrent off state of the compressor 30 may include a state in which the switch 12 is turned off by the controller 10. Thus, the clutch 31 is disengaged and the compressor 30 is turned off in the case in which the converted temperature of the clutch 31 is equal to or lower than the first set temperature and the current condition is determined to be a clutch disengagement condition in the compressor clutch operation condition determination logic of FIG. 3A.

In addition, the set reoperation condition may include a condition in which the reoperation of the compressor is not the first operation of the compressor after starting of the vehicle. The set reoperation condition may also include a condition in which the air conditioner is on (air conditioner switch on), and a condition in which the temperature of an evaporator detected by an evaporator temperature sensor (thermistor) 3 is equal to or higher than a predetermined critical freezing temperature. In addition, the set reoperation condition may also include a condition in which the pressure of the air conditioner refrigerant detected by the refrigerant pressure sensor 2 is within a predetermined pressure range.

In the embodiment of the present disclosure, in the case in which the set reoperation condition is satisfied in the overcurrent off state of the compressor 30, the controller 10 starts a control process for reoperation of the air conditioner compressor shown in FIG. 5.

In other words, in the embodiment of the present disclosure, the microcomputer 11 of the controller 10 determines whether all of the conditions are satisfied in the overcurrent off state of the compressor 30 (S11). Such conditions include the condition in which the reoperation of the compressor is not the first operation of the compressor after starting of the vehicle, the condition in which the air conditioner is on (air conditioner switch on), the condition in which the temperature of the evaporator is equal to or higher than the predetermined critical freezing temperature, and the condition in which the pressure of the air conditioner refrigerant is within the predetermined pressure range. Upon determining that all of the conditions are satisfied, the microcomputer 11 of the controller 10 starts the control process of FIG. 5.

In the condition in which the temperature of the evaporator detected by the evaporator temperature sensor 3 is equal to or higher than the critical freezing temperature, as described above, the microcomputer 11 of the controller 10 reoperates the compressor 30. In the condition in which the temperature of the evaporator is lower than the critical freezing temperature, as described above, the compressor 30 is not reoperated, since the evaporator may be frozen.

In addition, the microcomputer 11 of the controller 10 reoperates the compressor 30 in the condition in which the pressure of the refrigerant is within the pressure range and does not reoperate the compressor in the case in which the pressure of the refrigerant deviates from the pressure range.

In the case in which all of the conditions are satisfied, the microcomputer 11 of the controller 10 determines whether a failure diagnosis delay time set so as to correspond to the temperature of external air detected by an external air temperature sensor 4 elapses (S12). When the failure diagnosis delay time elapses, the microcomputer 11 of the controller 10 performs the clutch operation condition determination process of FIG. 3A or 3B (S13).

Here, the failure diagnosis delay time may be set as shown in Table 1 below and the microcomputer 11 of the controller 10 determines the failure diagnosis delay time corresponding to the current temperature of external air using set data shown in Table 1 below.

TABLE 1

| Temperature of external air | Failure diagnosis delay time |
|---|---|
| 35° C. | 10 sec |
| −10° C. | 50 sec |

In the example of Table 1 above, the failure diagnosis delay time in an intermediate section between 35° C. and −10° C., each of which is the temperature of external air, may be set to a value calculated by interpolation.

When the failure diagnosis delay time elapses, the microcomputer 11 of the controller 10 performs the clutch operation condition determination process of FIG. 3A or 3B (S13). Upon determining in steps S2 and S5 of FIG. 3A or 3B that the current condition is a clutch operation allowance condition, the microcomputer 11 of the controller 10 outputs an operation signal for turning on the switch 12 in the controller 10. As a result, the switch 12 in the controller 10 is turned on, whereby clutch engagement is performed (S14) and the compressor is reoperated.

Subsequently, the microcomputer 11 of the controller 10 monitors operation current that flows in the electromagnetic coil 32 of the clutch 31 during operation of the compressor 30 and compares the monitored operation current with the current limit (S15). The microcomputer 11 maintains the on state of the switch 12 in the controller 10, the engaged state of the clutch 31, and the operation state of the compressor 30 in the state in which the value of the operation current is less than the current limit value On the other hand, in the case in which the clutch operation condition determination process of FIG. 3A or 3B is performed in step S13 of FIG. 5 and the current condition is determined to be a clutch disengagement condition in step S2 of FIG. 3A or steps S2' and S3 of FIG. 3B, the microcomputer 11 of the controller 10 maintains the off state of the switch 12 in the controller 10, the disengaged state of the clutch 31, and the off state of the compressor 30.

Also, in the case in which the value of the operation current is equal to or greater than the current limit value in step S15 of FIG. 5 during operation of the compressor 30, the microcomputer 11 of the controller 10 turns off the switch 12 in the controller 10 and disengages the clutch 31 in order to turn off the compressor 30 again (S16).

The compressor control apparatus and method according to the present disclosure have been described above. In the compressor control apparatus and method according to the present disclosure, it is possible to remove a relay switch in a conventional junction box configured to selectively apply battery current to the compressor clutch and a diode configured to prevent surge voltage and to remove a circuit and wiring related thereto.

In addition, a diode configured to remove back electromagnetic force and surge voltage due to current fluctuation when the relay switch is opened and closed may be removed from the clutch of the compressor, which becomes a load end, and a circuit and wiring related thereto may be removed. In addition, it is possible to reduce cost and apparatus failure probability through reduction in number of parts and so simplification of circuit construction.

As is apparent from the foregoing, in the compressor control apparatus and method according to the present disclosure, it is possible to simplify the construction of a compressor control circuit, to reduce the number of parts and to reduce costs. Specifically, it is possible to remove a relay switch in a conventional junction box configured to selectively apply battery current to the clutch of the air conditioner compressor and a diode configured to prevent surge voltage and to remove a circuit and wiring related thereto. In addition, a diode configured to remove back electromagnetic force and surge voltage due to current fluctuation when the relay switch is opened and closed may be removed from the clutch of the compressor, which becomes a load end, and a circuit and wiring related thereto may be removed.

The effects of the present disclosure are not limited to those mentioned above. Other unmentioned effects should be clearly understood by an ordinary skilled person from the above description.

It should be apparent to a person of ordinary skill in the art that the present disclosure described above is not limited to the above embodiments and the accompanying drawings and that various substitutions, modifications, and variations can be made without departing from the technical idea of the present disclosure.

What is claimed is:

1. A compressor control apparatus, comprising:
  a sensor configured to detect air conditioner operation state information necessary to control engagement and disengagement of a clutch of an air conditioner compressor;
  an electromagnetic coil in the clutch of the air conditioner compressor configured to perform clutch engagement upon receiving battery current;
  a microcomputer configured to determine whether a current air conditioner operation state satisfies a clutch engagement allowance condition or a clutch disengagement condition based on the air conditioner operation state information detected by the sensor and to output an operation signal based on a result of determination; and
  a switch configured to be turned on or off according to the operation signal output by the microcomputer and to control supply of the battery current to the electromagnetic coil such that clutch engagement or clutch disengagement is performed,
  wherein the electromagnetic coil is directly connected to an ignition power end of a vehicle via a first wire present between the electromagnetic coil and the ignition power end, and a battery is directly connected to the ignition power end via a second wire present between the battery and the ignition power end, there being no relay switch between the battery and the ignition power end, and the ignition power end being configured to be turned on at a time of key on of the vehicle, and wherein the ignition power end is configured to receive the battery current only via the second wire from the battery and supply the received battery current only via the first wire to the electromagnetic coil.

2. The compressor control apparatus according to claim 1, wherein
the switch is located on a circuit between the electromagnetic coil and a ground end so as to open and close an electrical conduction path of the battery current that passes through the electromagnetic coil and flows to the ground end at a time of on or off operation.

3. The compressor control apparatus according to claim 1, wherein the switch is a semiconductor switch installed in a controller together with the microcomputer.

4. The compressor control apparatus according to claim 1, wherein
the sensor comprises a refrigerant pressure sensor configured to detect pressure of a refrigerant of an air conditioner, and
the microcomputer of a controller determines that the clutch engagement allowance condition is satisfied in a case in which the pressure of the refrigerant detected by the refrigerant pressure sensor is higher than a predetermined first set pressure in an off state of the compressor.

5. The compressor control apparatus according to claim 4, wherein
in a case in which the detected pressure of the refrigerant is equal to or less than the predetermined first set pressure, the microcomputer of the controller determines that the clutch disengagement condition is satisfied, and
upon determining that the clutch disengagement condition is satisfied or in a case in which the battery current applied to the electromagnetic coil is equal to or greater than a predetermined current limit, the microcomputer of the controller turns off the switch to disengage the clutch.

6. The compressor control apparatus according to claim 5, wherein, in a case in which the pressure of the refrigerant detected by the refrigerant pressure sensor is higher than a predetermined second set pressure in a state in which the clutch disengagement condition is determined to be satisfied, the microcomputer of the controller determines that the clutch engagement allowance condition is satisfied, and
wherein the predetermined second set pressure>the predetermined first set pressure.

7. The compressor control apparatus according to claim 4, wherein, upon determining that set reoperation conditions are all satisfied and the clutch engagement allowance condition is satisfied in a state in which the compressor is off due to overcurrent, the microcomputer of the controller turns on the switch to reoperate the clutch,
wherein the sensor further comprises an evaporator sensor configured to detect temperature of an evaporator, and
wherein the set reoperation conditions comprise a condition in which a reoperation of the compressor is not a first operation of the compressor after starting of a vehicle, a condition in which the air conditioner is on, and a condition in which the temperature of the evaporator detected by the evaporator sensor is equal to or higher than a predetermined critical freezing temperature.

8. The compressor control apparatus according to claim 7, wherein the set reoperation condition further comprises a condition in which the pressure of the refrigerant detected by the refrigerant pressure sensor is within a predetermined pressure range.

9. The compressor control apparatus according to claim 7, wherein the microcomputer of the controller determines whether a predetermined time elapses in a case in which the set reoperation condition is satisfied, and turns on the switch to reoperate the clutch upon determining that the clutch engagement allowance condition is satisfied in a state in which the predetermined time has elapsed.

10. The compressor control apparatus according to claim 9, wherein the microcomputer of the controller determines the predetermined time to be a failure diagnosis delay time corresponding to temperature of external air detected by an external air temperature sensor.

11. The compressor control apparatus according to claim 7, wherein the state in which the compressor is off due to overcurrent is:
a state in which the switch is off after the pressure of the refrigerant detected by the refrigerant pressure sensor is equal to or less than the predetermined first set pressure and thus the clutch disengagement condition is determined to be satisfied by the microcomputer of the controller; or
a state in which the battery current applied to the electromagnetic coil is equal to or greater than a predetermined current limit and thus the switch is off.

12. The compressor control apparatus according to claim 1, wherein
the sensor comprises a refrigerant pressure sensor configured to detect pressure of a refrigerant of an air conditioner, and
the microcomputer of a controller determines that the clutch engagement allowance condition is satisfied in a case in which temperature of the clutch converted from the pressure of the refrigerant detected by the refrigerant pressure sensor using set data is higher than a predetermined first set temperature in an off state of the compressor.

13. The compressor control apparatus according to claim 12, wherein
in a case in which the converted temperature of the clutch is equal to or less than the predetermined first set temperature, the microcomputer of the controller determines that the clutch disengagement condition is satisfied, and
upon determining that the clutch disengagement condition is satisfied or in a case in which the battery current applied to the electromagnetic coil is equal to or greater than a predetermined current limit, the microcomputer of the controller turns off the switch to disengage the clutch.

14. The compressor control apparatus according to claim 13, wherein, in a case in which the temperature of the clutch converted from the pressure of the refrigerant detected by the refrigerant pressure sensor is higher than a predetermined second set temperature in a state in which the clutch disengagement condition is determined to be satisfied, the microcomputer of the controller determines that the clutch engagement allowance condition is satisfied, and
wherein the predetermined second set temperature>the predetermined first set temperature.

15. A compressor control method, comprising:
detecting, by a sensor, air conditioner operation state information necessary to control engagement and disengagement of a clutch of an air conditioner compressor;

determining, by a microcomputer, whether a current air conditioner operation state satisfies a clutch engagement allowance condition or a clutch disengagement condition based on the air conditioner operation state information detected by the sensor and outputting an operation signal based on a result of determination; and turning on or off a switch configured to control supply of battery current to an electromagnetic coil in the clutch according to the operation signal output by the microcomputer such that clutch engagement or clutch disengagement is performed, wherein the electromagnetic coil is directly connected to an ignition power end of a vehicle via a first wire present between the electromagnetic coil and the ignition power end, and a battery is directly connected to the ignition power end via a second wire present between the battery and the ignition power end, there being no relay switch between the battery and the ignition power end, and the ignition power end being configured to be turned on at a time of key on of the vehicle, and wherein the ignition power end is configured to receive the battery current only via the second wire from the battery and supply the received battery current only via the first wire to the electromagnetic coil.

16. The compressor control method according to claim 15, wherein the sensor comprises a refrigerant pressure sensor configured to detect pressure of a refrigerant of an air conditioner, and the microcomputer determines that the clutch engagement allowance condition is satisfied in a case in which the pressure of the refrigerant detected by the refrigerant pressure sensor is higher than a predetermined first set pressure in an off state of the compressor.

17. The compressor control method according to claim 16, wherein in a case in which the detected pressure of the refrigerant is equal to or less than the predetermined first set pressure, the microcomputer determines that the clutch disengagement condition is satisfied, and upon determining that the clutch disengagement condition is satisfied or in a case in which the battery current applied to the electromagnetic coil is equal to or greater than a predetermined current limit, the microcomputer turns off the switch to disengage the clutch.

18. The compressor control method according to claim 17, wherein, in a case in which the pressure of the refrigerant detected by the refrigerant pressure sensor is higher than a predetermined second set pressure in a state in which the clutch disengagement condition is determined to be satisfied, the microcomputer determines that the clutch engagement allowance condition is satisfied, and wherein the predetermined second set pressure>the predetermined first set pressure.

19. The compressor control method according to claim 16, wherein, upon determining that set reoperation conditions are all satisfied and the clutch engagement allowance condition is satisfied in a state in which the compressor is off due to overcurrent, the microcomputer turns on the switch to reoperate the clutch, wherein the sensor further comprises an evaporator sensor configured to detect temperature of an evaporator, and wherein the set reoperation conditions comprise a condition in which a reoperation of the compressor is not a first operation of the compressor after starting of a vehicle, a condition in which the air conditioner is on, and a condition in which the temperature of the evaporator detected by the evaporator sensor is equal to or higher than a predetermined critical freezing temperature.

20. The compressor control method according to claim 19 wherein the set reoperation condition further comprises a condition in which the pressure of the refrigerant detected by the refrigerant pressure sensor is within a predetermined pressure range.

21. The compressor control method according to claim 19, wherein the microcomputer determines whether a predetermined time elapses in a case in which the set reoperation condition is satisfied, and turns on the switch to reoperate the clutch upon determining that the clutch engagement allowance condition is satisfied in a state in which the predetermined time has elapsed.

22. The compressor control method according to claim 21, wherein the microcomputer determines the predetermined time to be a failure diagnosis delay time corresponding to temperature of external air detected by an external air temperature sensor.

23. The compressor control method according to claim 19, wherein the state in which the compressor is off due to overcurrent is:

a state in which the switch is off after temperature of the clutch converted from the pressure of the refrigerant detected by the refrigerant pressure sensor is equal to or less than a predetermined first set temperature and the clutch disengagement condition is determined to be satisfied by the microcomputer; or a state in which the battery current applied to the electromagnetic coil is equal to or greater than a predetermined current limit and thus the switch is off.

24. The compressor control apparatus according to claim 1, wherein a controller includes the switch and the microcomputer, wherein, when an air conditioner is turned off, the microcomputer of the controller turns off the switch of the controller, and wherein, when the air conditioner is turned on, an operation signal output by the microcomputer of the controller is transmitted to the switch of the controller, and thus the switch of the controller is closed.

* * * * *